3,050,451
PROCESS FOR THE PREPARATION OF CARBON WITH HIGH MODERATING PROPERTIES AND THE USE THEREOF IN NUCLEAR REACTORS
Willem J. D. van Dijck, The Hague, and Hendrik Kloosterziel, Amsterdam, Netherlands, assignors to Shell Oil Company, a corporation of Delaware
No Drawing. Filed Jan. 27, 1958, Ser. No. 711,128
Claims priority, application Netherlands Jan. 31, 1957
8 Claims. (Cl. 204—154.2)

This invention relates to a process for the preparation of a new carbon product, which, owing to the presence of a small content of firmly bound deuterium, has outstanding properties for use in nuclear reactors as moderator, reflector or heat carrier, and to the use of this product for the said purpose.

In the operation of nuclear reactors, in addition to the fissile material so-called moderators are usually present in the reaction zone (viz. the space in which the nuclear reaction occurs), which substances serve to reduce the speed of the fast neutrons formed in the fission process to such an extent that they change into slow or thermal neutrons; moreover, these substances may also act as a coolant. The design of nuclear reactors using different moderators is explained in some detail in U.S. Patent 2,708,656 to Fermi and Szilard.

Although the activity of carbon is inferior to that of other moderators such as beryllium and compounds thereof, carbon in the form of graphite is nevertheless frequently used as a moderator in nuclear reactors. This frequent use is not only due to the fact that carbon is cheaper than substances such as heavy water and beryllium compounds, but also to the fact that, unlike beryllium compounds it is not poisonous, and unlike heavy water it is a solid substance with an extremely low vapor pressure. As a result of the latter it is possible, on the one hand, to use the moderator as material of construction for the nuclear reactor, and on the other hand to combine high temperatures with normal, low pressures. Especially at the high temperatures at which energy-producing nuclear reactors (known as power reactors) are operated, the high pressures occurring when a liquid moderator with a high vapor pressure is employed, are unnecessary when a substance with a low vapor pressure is used as moderator. This results, of course, in a very considerable saving in the cost of the apparatus, and also eliminates the risks attending the operation of nuclear reactors at high pressures. In addition, carbon has the advantage of having a good resistance to very high temperatures and also to radio-active radiation and being readily reducible to a finely-divided form, suitable for fluidization, so that it becomes possible to transport it in the nuclear reactor by means of the fluidized solids technique.

In patent application Serial No. 606,989, filed August 30, 1956, and now U.S. Patent No. 3,005,761, a process is disclosed for the preparation of carbon products of which the moderating effect is considerably greater than that of graphite which is the most active carbon base moderator hitherto available. According to the said process deuterated products obtained by deuterating heavy, particularly polycyclic, aromatic hydrocarbons are carbonized by the use of any of the methods known per se for the preparation of carbon from carbon-rich material. In this case the aromatic hydrocarbon material should therefore first be deuterated separately, to which end it is caused to flow down in a liquid state in the form of a thin layer at elevated temperature and pressure over a catalyst which is arranged in a stationary condition and promotes the exchange of hydrogen with deuterium while passing through counter-currently at the same time deuterium or a gas containing or yielding deuterium; the deuterated aromatic material thus obtained is then converted into the desired carbon product by carbonization.

It has now been found that nongraphitic coke containing from 0.5 to 5% of firmly bound deuterium and having a strong moderating effect may be prepared more simply and cheaply, viz. directly from solid carbon-rich material, e.g. petroleum coke, without the necessity of using special catalysts. It is possible to effect an exchange with deuterium ($H_2^2$) of hydrogen ($H_2^1$) bound to the carbon by treating the carbon, preferably in a dry finely-divided state, with deuterium or gaseous compounds yielding deuterium.

The process according to the invention comprises treating carbon containing bound hydrogen of species $H_2^1$, preferably in a finely-divided form, at an elevated temperature with a gas, the sole hydrogen species of which is $H_2^2$ e.g. consisting wholly or predominantly of deuterium and/or deuterium compounds which, under the reaction conditions, yield deuterium or exchange it with hydrogen.

This treatment in which, as has been found, hydrogen atoms from the carbon are readily exchanged with deuterium atoms, is preferably continued until at least 80% of the hydrogen is exchanged with deuterium.

The process according to the invention is carried out at elevated temperatures, these generally being at least approximately 500° C., as at lower temperatures the exchange reaction proceeds too slowly for practical purposes. The temperatures to be applied may vary somewhat, depending on the composition of the carbon to be treated and are conveniently in the range of from approximately 500° C. to approximately 1000° C., preferably in the range of from 550° to 750° C.

The process according to the invention may be carried out at atmospheric pressure or at reduced or elevated pressure; it may be advisable to operate at elevated pressure, e.g. 2–500 atm., since in this case the rate of exchange is higher and moreover a reaction zone of smaller dimensions may be used.

The exchange with deuterium of hydrogen bound in the carbon may be carried out by treating the carbon in a reaction zone at the desired high temperature and passing through the carbon compounds which yield deuterium or exchange it with the hydrogen, the hydrogen split off during the exchange being removed from the reaction zone.

According to the preferred embodiment the exchange takes place continuously with the use of the countercurrent principle, the carbon being passed through a reaction zone in which the carbon is contacted at the desired temperature with a stream of the gas phase containing or yielding deuterium, which stream is passed in the opposite direction. This operation is preferably carried out in such a way that the carbon to be deuterated is passed downward through the reaction zone in a finely-divided form, while the gas flows in an upward direction through the carbon. In this operation the treated carbon may be removed continuously from the bottom part of the reaction zone, and the hydrogen formed in the exchange reaction, and which moves upward in the reaction zone, may be removed, also continuously, from the upper part.

When a counter-current operation is used the feed rate through the reaction zone of the finely-divided carbon to be treated, which is dependent on the temperature used, is preferably adjusted in such a way that the gas removed from the reaction zone contains hydrogen with little or no deuterium, i.e. the sole hydrogen species is essentially $H_2^1$. It is advisable to establish such a temperature gradient that the temperature in the top part of the reaction zone is higher, e.g. 750° C., than in the bottom part, e.g. 500° C., since the exchange reaction may thereby be promoted.

The carbon used as starting material in the process according to the invention may be a carbon of any source containing a certain content (for example, a few percentages by weight) of bound hydrogen, such as coke, obtained by carbonization or coking of solid carbonaceous material or as by-product of the thermal cracking of mineral oils, carbon obtained by pyrolytic decomposition of gaseous hydrocarbons, and the like. Such carbons are preferred as are free or substantially free of harmful elements, such as boron, sulfur and nitrogen, in view of the use of the product prepared according to the invention in nuclear reactors where such elements have a harmful effect on account of their neutron-absorption power.

The carbon may be freed beforehand of any traces therein of hydrocarbons absorbed and/or water; this may be effected by subjecting the carbon to a high temperature, e.g. 500 to 600° C., and/or to a high vacuum.

In order to realize an intimate contact with the gas phase containing or yielding deuterium it is advisable that the carbon used as starting material be present in a finely-divided form, i.e. have a particle size of less than 5 mm. Particularly suitable are carbon particles having a microspheroidal shape and for example, approximately 100–250 microns diameter; these can be made in any manner known per se, e.g. by suspending powdery, solid carbon-rich material in a gas and heating the resultant supension at a temperature above the decomposition point of the carbon-rich material, but below the melting point of the carbon to be prepared, whereupon the microspheroidal carbon formed is cooled and separated. The deuterium treatment of microspheroidal carbon particles may be carried out advantageously with the use of the fluidized solids technique.

The reaction zone, in which the process according to the invention is carried out, may consist of a single reaction vessel, provided with heating means and also with supply lines for the carbon particles to be treated and for the gas containing or yielding deuterium, and with discharge lines for the hydrogen and carbon product formed. If the carbon removed from the reaction zone still contains exchangeable hydrogen, it may be recycled to the reaction zone and further treated therein. If desired two or more reaction vessels connected in series may be used, in which case incompletely converted carbon particles from a preceding reaction vessel which still contain exchangeable hydrogen are further treated in the following vessel or vessels until the conversion has completely or substantially completely taken place.

In order to ensure uniform distribution of the gas it is convenient to supply this gas to the reaction zone via a gas distributing means, for example, a perforated plate, a grid or the like extending over the entire cross-section of the reaction zone.

If the deuteration takes place in a vertical or substantially vertically arranged reaction zone in which the carbon moves from the top to the bottom, the carbon material to be treated may be transported to the supply at the top part by means of methods known per se, either mechanically, for example with the air of an elevator, or pneumatically by the gas lift principle.

As stated above the coke to be deuterated is charged at the top of the reaction zone at such a rate that the hydrogen withdrawn at the top is substantially free of deuterium. On the other hand it is desired that the coke removed at the bottom be substantially completely deuterated. This is assured by providing a reaction zone of sufficient capacity to afford a suitable residence time. This will depend upon the reaction conditions, especially the pressure. For example, at 550° C. and 500 atm. pressure a reaction zone 1.6 m. high and 18 cm. diameter will afford a production of about 4 kg. deuterated coke per hour with a contact time of about 10 hours. At 1 atm. pressure a reaction zone about 12 m. high and 48 cm. diameter affording a contact time of over 500 hours is required for the same production. In a typical case the reaction zone is 11.2 m. high and 21 cm. diameter and operates at 550° C. and 10 atm. pressure. Petroleum coke is charged at the top at a rate of 4 kg./hr. and deuterium is charged at the bottom at a rate of 785 l./hr. (S.T.P.). The residence time of the coke in the reaction zone is 99 hr. and that of the gas is 0.84 hr.

The gas with which the carbon in the reaction zone is contacted may consist of pure or substantially pure deuterium. In addition to deuterium minor quantities of other components may also be present, provided the conversion contemplated or the neutron-absorption power of the carbon is not adversely affected. It is generally preferable to use as pure deuterium as possible. e.g. of a purity of over 98%. Instead of deuterium gases may be used consisting wholly or partly of deuterium compounds yielding deuterium under the reaction conditions, particularly deuterated gaseous saturated or unsaturated hydrocarbons, such as methane, ethane, ethylene and the like.

Under the reaction conditions used in the process according to the invention the desired exchange reaction may be accompanied by side-reactions in which are formed lower hydrocarbons containing deuterium, such as methane and ethane. Although these by-products are only formed to a limited extent, this formation is nevertheless undesirable as it may lead to losses of deuterium.

It has been found that the formation of the said hydrocarbons may be wholly or substantially wholly avoided by subjecting the carbon to a pretreatment with hydrogen under conditions similar to or severer than those under which the exchange with deuterium of the hydrogen bound in the carbon is subsequently carried out. In this way it has been found possible to cause the side-reactions giving rise to the formation of lower hydrocarbons from the carbon to proceed with cheap hydrogen. In this case few if any further losses occur through the formation of deuterated lower hydrocarbons in the subsequent treatment of the carbon thus pretreated.

Although the above pretreatment with hydrogen may be carried out at the same temperature as the subsequent exchange reaction, for this reaction, a somewhat higher, e.g. 25 to 75° C. higher, temperature is preferably employed. For this pretreatment, which may take place under atmospheric pressure or a pressure varying therefrom, hydrogen is conveniently used which has been exchanged in the treatment of the carbon with deuterium.

As an example, a petroleum coke is heated at 500° C. for 4 hrs. in vacuo. About 10% of the coke distills off and is recovered as a brown semi-solid mass. The remaining coke contains 95.1% C and 2.2% H (i.e. C/H atomic ratio of 7:1.9) and has a surface area of 20 m.$^2$/g. This coke is then further heated at 550° C. for 16 hours whereby a small additional amount of material is removed and it is then treated with hydrogen for 6 hrs. at 500° C. and a pressure of 30 cm. Hg. During the hydrogen treatment about 0.3 mole of hydrogen per kg. of the coke is removed as also 0.03 mole/kg. of methane and traces of other volatile hydrocarbons. The resulting coke (after picking up a small amount of moisture from the air) contains 96.9% C and 1:5% H (C:H=7:1.3) and has a surface area of 1.3 m.$^2$/g.

When the exchange reaction is carried out countercurrently pretreatment of the carbon can be very suitably effected in the part of the apparatus situated near the supply of the carbon to be treated, where exchanged hydrogen is present which moves countercurrently to the carbon supplied. If a higher temperature is maintained in this part of the apparatus than in the part where the exchange reaction takes place, the side-reactions giving rise to formation of gaseous hydrocarbons proceed entirely or substantially entirely in the first-mentioned part, before the carbon is contacted with gas containing deuterium.

The carbon products prepared according to the invention have a minor content of deuterium which is so firmly bound to the carbon that this content itself is not reduced, or only slightly, even when the product is heated at high temperatures for a long period. This deuterium content may vary, for example, from 0.5 to 5 percent by weight depending on the nature of the carbon used as starting material and the reaction conditions employed.

Owing to this deuterium content the carbon products prepared according to the invention possess especially favorable moderating properties when used in nuclear reactors as a result of which these products are superior to the best solid carbon-base moderators such as graphite hitherto used in nuclear reactors. They are therefore pre-eminently suitable for use as moderator in nuclear reactors where they can be used to special advantage in a finely-divided fluidizable state.

Compared to the preparation of graphite carbon, starting from less dense carbon, for which very prolonged heating at extremely high temperatures of, for example, 2000 to 2500° C. or even considerably higher is required, the present process, in addition to the stronger moderating effect of the carbon obtained thereby, has the great advantage that in this case the starting material is treated at approximately 1000° C., and a short heating period of, for example, a few hours only is sufficient.

The carbon products according to the invention are very suitable for use in nuclear reactors in which the fissible material, e.g. uranium oxide or uranium carbide, and the moderator are arranged in the reaction chamber in a stationary condition and the heat generated therein is removed by a fluid. The fissible material, the carbon and any thorium carbide or other fertile material (i.e. a substance which may be converted by the effect of neutrons into a fissible material) may in this case be conveniently present as a homogeneous or substantially homogeneous mixture in the form of a ceramic material with open porosity.

The carbon products according to the invention may also be used to advantage in nuclear reactors of the type in which a granular mixture of which all or substantially all the individual particles contain both fissible material and a heat carrier which also acts as moderator, is cycled through the reactor and a cooler situated outside it, the said mixture being transported to and from the cooler at least partly in a fluidized state.

The carbon products prepared according to the invention may not only be used as moderator and heat carrier but also as materials for the reflector mantle surrounding the reaction zone in nuclear reactors and serving to reflect some of the neutrons leaving the reaction zone. In these and many other cases it is desired to employ the above described moderator in the form of plates, blocks, or other shaped pieces. Such shaped pieces are made according to the invention by combining the deuterated coke with deuterated oil or tar, preferably consisting essentially of deuterated polynuclear aromatics, followed by compressing or molding or alternatively by compressing or molding followed by impregnation with the deuterated hydrocarbon. Following this the shaped pieces are bonded by heat or subjected to a homogenizing treatment. The deuterated hydrocarbons present in the shaped pieces and the carbon which contains deuterium are converted into a substantially homogeneous carbon-deuterium product with a small content of firmly bound deuterium. The shaped pieces thus obtained are not porous or only very slightly so and have a solidity which is considerably better than that of shaped pieces made from graphite and a binding agent.

The shaped pieces prepared as described above may be subjected to a purely thermal treatment by heating them at an elevated temperature sufficient to cause coking of the oil used as a binder. Suitable temperatures are between about 600 and 1000° C.

It is preferred, however, to subject the formed pieces to an homogenizing (cross linking) treatment which is effected by exposing them preferably at elevated temperatures of for example approximately 100 to 300° C., to high energy radiation such as radio-active rays, fast electrons, gamma rays, or neutrons. While theoretically any ionizing radiation having an energy above about 10 electron volts can be used, for practical treatments the photons or ionizing particles should have energies of at least about 10,000 electron volts or of the order of X-rays. To this end appropriate use may be made of the radiation occurring in nuclear reactors by introducing the shaped pieces for treatment into a nuclear reactor and allowing the reactor to operate for a considerable time, e.g. 10 days or more, at part e.g., $\frac{1}{10}$, of the normal load. In the course of this homogenizing treatment free valence arms are created both in the original carbon and in the binder present in the mixture to be homogenized. At the boundaries between the carbon particles and the binder free arms in the carbon are subsequently linked to free arms in the binder thus combining the carbon and binder and forming a dense network of crossed links (a similar process to that which takes place in the grafting of polymers). The homogenizing treatment may be continued until it is substantially complete as can be determined by following the changes in the heat and/or electrical conductivity of the formed pieces with time. When the treatment is complete these values cease to change. Normally, however, the homogenizing treatment is continued only until the pieces have acquired a sufficient mechanical strength.

The deuterated hydrocarbon material with which the carbon which contains deuterium is combined may be prepared by deuterating heavy aromatic hydrocarbon material; that is such materials as have a vapor pressure considerably below (at least 20% below) the operating pressure at the temperature at which the homogenizing treatment is carried out. Particularly suitable as such are polycyclic aromatic hydrocarbons such as anthracene, phenanthene, acenaphthene, diphenyl, fluorene, pyrene, chrycene and their homologues or mixtures consisting wholly or predominantly thereof such as heavy aromatic tar oil fractions or aromatic extracts from heavy mineral oil fractions. A hydrocarbon material which is solid at normal temperature and has a melting point of at least approximately 50° C. is preferably used. These various materials may be deuterated in the conventional manners and are preferably deuterated until substantially all of the hydrogen therein has been substituted by deuterium.

The ratio by weight in which the deuterated carbon and deuterated hydrocarbon material are combined with each other may vary considerably depending on the deuterium content of the carbon, the composition of the deuterated hydrocarbon material, and the deuterium content desired in the end product. In general it is preferably for this ratio to be such that the atomic ratio of deuterium to carbon in the end product is at least 1:5 e.g., 2:7.

The plates or other shaped pieces obtained according to the invention possess a very low neutron absorbing capacity and a high nondeformability which is better than that of a graphite lattice. The deuterium is firmly bound to the carbon and is lost hardly at all even on prolonged heating. Even this small loss may be completely prevented by maintaining about the pieces an atmosphere containing a small concentration of deuterium.

*Example 1*

A petroleum coke having a particle size of between 10 and 20 mesh A.S.T.M. (corresponding to 2 mm.–0.84 mm.) was introduced into a cylindrical quartz reactor with an inside diameter of 20 mm., and then pumped off at a temperature of 650° C. to a pressure of 0.01 mm. Hg. The coke, after this treatment, now had a hydrogen content of 2.4% by weight, corresponding to a ratio of 1 atom of hydrogen per 3 atoms of carbon, while the specific surface thereof determined by means of nitrogen adsorption at −196° C. according to the so-called B.E.T. method was 1.3 square meters per gram.

Deuterium gas (consisting of 98.4 percent by volume of $D_2$ and 1.6 percent by volume of HD) was then passed over this coke in the same quartz reactor at 575° C. and a pressure of one atmosphere at a rate of 0.4 liter (N.T.P.) per gram of carbon per hour. After a three-hour treatment it was found that 88% of the hydrogen originally present in the coke had been exchanged with deuterium with the formation of a coke product in which the atomic ratio of carbon:deuterium:hydrogen was 1:0.29:0.04.

*Example II*

The starting material used was a petroleum coke with a content of bound hydrogen of 2.3 percent by weight, corresponding to an atomic ratio of hydrogen to carbon of 2:7. This coke was pumped off in a finely-divided form (10–20 mesh A.S.T.M.) at a temperature of 650° C. to a pressure of 0.01 mm. Hg.

Hydrogen was then passed over this carbon for six hours at a temperature of 600° C. and a pressure of 0.5 atmosphere; it was found that a mixture of lower hydrocarbons had formed in a quantity corresponding to a quantity of hydrogen amounting to over three percent of the hydrogen bound to the carbon.

An exchange with deuterium was effected with the coke thus pretreated in the manner indicated in Example I at a temperature of 575° C. and a pressure of one atmosphere. This deuteration yielded a coke product having a deuterium content of 4.3 percent by weight, without the formation of hydrocarbons containing deuterium.

*Example III*

The carbon-deuterium product produced as in Example I is ground to pass a 50 mesh-U.S. standard sieve and then mulled at 100° C. with 15% by weight of a substantially sulfur-free and substantially completely deuterated aromatic tar pitch having a melting point of about 60° C. The resulting paste is hydraulically pressed into bricks using a pressure of about 150 kg./cm.$^2$. The bricks are slowly heated to a temperature of about 600° C. over a period of three days. They are then placed in a γ-irradiation facility (cobalt source) where they are given a dose of irradiation equivalent to $2 \times 10^7$ rad in order to homogenize them. The bricks so produced are suitable as a moderator and also for constructing the reflector mantle surrounding the reaction zone of a nuclear reactor.

We claim as our invention:

1. Process for the production of a solid carbon product containing bound deuterium and particularly suitable for use in nuclear reactors which comprises forming a bed of coke-like carbon particles containing from 0.5 to 5 percent of bound hydrogen of species $H_2^1$, maintaining said bed at a temperature between about 500° C. to about 1000° C., passing into one end of said bed a gas the sole hydrogen species of which is essentially $H_2^2$, removing from the other end of said bed a gas the sole hydrogen species of which is essentially $H_2^1$, and removing from said bed a solid coke-like carbon product containing bound hydrogen predominantly of the species $H_2^2$.

2. Process according to claim 1 in which the gas is passed through the bed as specified until at least 80% of the hydrogen of species $H_2^1$ in the carbon is changed to the species $H_2^2$.

3. Process according to claim 1 in which the said carbon containing $H_2^1$ is added to the top of said bed, the carbon containing $H_2^2$ is withdrawn from the bottom of the bed, and the gas containing the $H_2^2$ species is passed upwardly through the bed.

4. Process according to claim 3 in which the temperature near the top of said bed is retained higher than near the bottom.

5. Process according to claim 1 further characterized in that the solid coke-like carbon particles containing from 0.5 to 5% of bound hydrogen of species $H_2^1$ is substantially free of boron, sulfur and nitrogen.

6. Process according to claim 1 further characterized in that the said solid coke-like carbon containing from 0.5 to 5% bound hydrogen species $H_2^1$ is pretreated with hydrogen of species $H_2^1$ prior to contact with hydrogen of species $H_2^2$ in said bed.

7. Process according to claim 1 further characterized in said solid coke-like carbon is in the form of particles having an average diameter less than 5 mm.

8. A process according to claim 1 wherein the coke-like carbon is petroleum coke.

References Cited in the file of this patent

UNITED STATES PATENTS

| | | |
|---|---|---|
| 2,408,696 | Smallwood | Oct. 1, 1946 |
| 2,468,978 | Hollis | May 3, 1949 |
| 2,653,878 | Sejersted et al. | Sept. 29, 1953 |
| 2,660,533 | West et al. | Nov. 24, 1953 |
| 2,780,526 | Fleck | Feb. 5, 1957 |
| 2,856,337 | Untermyer | Oct. 14, 1958 |
| 2,860,093 | Wigner et al. | Nov. 11, 1958 |

FOREIGN PATENTS

| | | |
|---|---|---|
| 690,861 | Great Britain | Apr. 29, 1953 |